United States Patent
Medower et al.

(10) Patent No.: US 6,656,392 B1
(45) Date of Patent: Dec. 2, 2003

(54) METHOD AND APPARATUS FOR COMPENSATING OPTICAL DISKS FOR EFFECTS OF THIN FILMS

(75) Inventors: Brian S. Medower, Boulder, CO (US); David L. Blankenbeckler, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 316 days.

(21) Appl. No.: 09/666,627

(22) Filed: Sep. 20, 2000

(51) Int. Cl.[7] .................... B29D 11/00; B29D 17/00
(52) U.S. Cl. .................... 264/1.33; 264/2.5; 425/810
(58) Field of Search ................. 264/1.33, 1.37, 264/1.1, 2.5, 106, 107; 425/810

(56) References Cited

U.S. PATENT DOCUMENTS

| | | | |
|---|---|---|---|
| 5,266,136 A | | 11/1993 | Kanome et al. ............ 156/150 |
| 5,344,682 A | * | 9/1994 | Mizukuki et al. ........... 428/913 |
| 5,500,266 A | * | 3/1996 | Durnin |
| 5,603,870 A | * | 2/1997 | Roll et al. .................. 264/2.5 |

FOREIGN PATENT DOCUMENTS

| | | |
|---|---|---|
| EP | 0 987 699 | 3/2000 |
| WO | WO 99/26240 | 5/1999 |

* cited by examiner

Primary Examiner—Mathieu D. Vargot
(74) Attorney, Agent, or Firm—MacPherson Kwok Chen & Heid LLP (57) ABSTRACT

An optical data storage/recording medium is provided with a thin film adjacent a data surface. Potential undesired effects of the presence or thickness of the thin film are adjusted for or compensated for to reduce or eliminate the undesired effects. In one aspect, the (uncoated) physical size of data layer features are adjusted so as to produce desired as-detected sizes, shapes or spacings, after a coating or thin film is present. In one aspect, length and/or width of raised features have an uncoated physical size less than the desired as-detected size. In one aspect, depressed features have uncoated physical dimensions greater than desired as-detected dimensions.

10 Claims, 7 Drawing Sheets

METHOD AND APPARATUS FOR COMPENSATING OPTICAL DISKS FOR EFFECTS OF THIN FILMS

Cross reference is made to U.S. patent application Ser. No. 09/540,657 filed Mar. 31, 2000 entitled: Low Profile Optical Head; U.S. patent application Ser. No. 09/652,975, filed Aug. 31, 2000 entitled: Double-Sided Digital Optical Disk and Method; U.S. patent application Ser. No. 09/315, 398 entitled Removable Optical Storage Device and System, filed May 20, 1999, now abandoned; U.S. Provisional Patent Application No. 60/140,633 entitled Combination Mastered and Writeable Medium and Use in Electronic Book Internet Appliance, filed Jun. 23, 1999, now abandoned; U.S. patent application Ser. No. 09/393,899 filed Sep. 10, 1999, entitled Content Distribution Method and Apparatus; U.S. patent application Ser. No. 09/393,150, filed Sep. 10, 1999, entitled Writeable Medium Access Control Using a Medium Writeable Area; U.S. patent application Ser. No. 09/457,104 filed Dec. 7, 1999 entitled Low Profile Optical Head; U.S. patent application Ser. No. 09/560,781, filed Apr. 28, 2000, entitled Miniature Optical Disk for Data Storage; and U.S. patent application Ser. No. 09/557,284, filed Apr. 24, 2000, entitled Tilt Focus Method and Mechanism for an Optical Drive, all of which are incorporated herein by reference.

BACKGROUND INFORMATION

Optical disks for storing information, e.g., in binary form, are provided with a plurality of optical "features", i.e., marks and/or shapes which can be optically detected and used, e.g. for read and/or write operations. Features may represent content information, such as information which can be ultimately provided to the user (regardless of whether the user is a human, a computer or other device), but may also include other information such as information used for purposes such as focus or tracking (or other servo functions), sector navigation or addressing (or other access operations), testing purposes, data security purposes, quality control purposes and any of a number of other purposes, as will be understood by those of skill in the art after understanding the present disclosure.

Disks with features thereon can be formed using any of a number of processes. One operable process falls generally in the category of injection molding. In injection molding (of any of a number of objects, including optical disks), a mold cavity having a size and shape corresponding to (e.g. after thermal shrinking) the size and shape of a final object, is injected with heated (fluid) thermoplastic material. After cooling e.g. to the glass transition temperature, the mold is opened and the object is removed.

In some situations, features on an optical disk may represent binary digits (bits), or groups of bits. In most situations, features can be considered to be either in the form of a protrusion or in the form of a depression. The difference can be most readily described in the context of a "stamper" (i.e. a device used in a molding device for forming a disk, the stamper having a generally planar surface and a plurality of protrusions extending from the planar surface into the mold cavity or depressions receding from the planar surface away from the mold cavity. Protrusions on a stamper provide depressions in the molded disk and depressions in the stamper provide protrusions in the molded disk. Features can be formed on one surface of the disk, or on both surfaces (in which case, two opposed stampers are used in the molding device. Although descriptions of a stamper-formed disk are believed useful in describing the difference between protrusion disk features and depression disk features, the present inventions, described below, is not limited to use in disks which are molded, but can be used in disks where features are formed in other fashions (such as by ablation, injection-compression, etching, or other methods).

In typical applications, bits or bit groups are represented by bumps (small protrusions) or pits, (small depressions). Typically, such bumps or pits are positioned along one or more spiral or circular tracks on at least one surface or layer of the disk. Disks may also contain features which do not directly represent data bits. For example, there may be features such as grooves or lands, typically in an extended circular or spiral pattern, e.g. for defining one or more tracks. In some cases, the tracks may have small-scale periodic or other deviations from a circular or spiral pattern (e.g. "wobbled" grooves), such as for tracking and/or timing purposes.

When optical read/write devices include some type of detection of reflectivity (or some other parameter related to reflectivity) as the read/write beam is successively in alignment with lands, bumps, pits, grooves, and the like, typically, reflectivity changes detectably as the beam crosses a leading or trailing edge of a feature. Accordingly, if, e.g., a read/write beam is maintained aligned with a track which bears pits or bumps, a reflectivity transition will ideally be detected near the (track-wise) leading edge and trailing edge of each bump or pit along the track and accordingly, the difference in timing between leading edge and trailing edge transitions in reflectivity are indicative of the (track-wise) length of the bump or pit. In this way, the presence and/or length of a bump or pit can be detected and converted to bits or bit patterns (according to any of a number of encoding schemes).

A number of aspects of the size, shape, distribution or arrangement of features on the disk (and/or of electrical, optical or other parameters associated with their detection) are of significance in the read/write operations. Among these are the as-detected track-wise or radial size of the features, the z-dimension size of the features, the radial spacing of features, the track-wise spacing of features and/or the DC offset of detection signals, particularly for high frequency (short-length) marks compared to relatively longer marks. The design of encoding schemes and design of the read/write device (including size and shape of the medium, wavelength of the read/write beam and other factors) place constraints on the size and/or shape of features which are desired and/or operable in an optical disk data storage system.

Many previous disk configurations provide a relatively thick, substantially transparent, plastic or other substrate through which the read/write beam passes, before reaching a data layer (i.e., a layer which has readable or writeable features formed or formable thereon). As used herein, "read/write" refers to beams, devices or processes which involve only reading, only writing, or both. In previous typical optical disk configurations, the effective thickness of such substrate (or other relatively thick covering layer) was sufficiently large that the surface of the interface which does not contact the data layer (e.g. the air-substrate interface) was substantially outside the depth-of-field of the optical system used to read or write data, and accordingly, at least some important optical parameters were substantially unaffected (within tolerances required for successful operation of read/write operations) by the presence of the layer (i.e., by the requirement that the read/write beam traverse the substrate before reaching the data layer).

However, it is believed certain limitations on performance arise from the provision of a relatively thick substrate or similar layer. Accordingly, it would be useful to provide a system, method and apparatus which can achieve desired as-detected feature sizes and/or shapes without being limited to relatively thick substrates (or other layers through which the read/write beam must pass before reaching the data layer) for the read/write medium.

SUMMARY OF THE INVENTION

The present invention includes a recognition of the existence, nature and/or source of certain problems, including as described herein.

According to one aspect of the present invention, it is recognized that, in at least some situations, providing a relatively thin film over some or all of an optical disk data layer can affect items such as the "as-detected" size or shape of bumps or pits or other features (e.g., compared to the actual physical size of the feature, e.g. as molded) and that, accordingly, it can be advantageous to correct for and/or account for such effects. As used herein, "as-detected" size, spacing or magnitude refers to whatever feature size, spacing or magnitude is detected by (or indicated by or derivable from electrical or digital signals indicative of beam reflectivity or other feature-indicative parameters) an optical disk read/write device (e.g. based on time difference between a beam crossing a leading feature edge and a trailing feature edge, including as described below). In one embodiment, the effect of a thin film is corrected-for by forming features which have an actual, physical, size different from the desired as-detected feature size, e.g., so that after providing the thin film, the as-detected size of the feature (including effects caused by the presence or thickness of the film) is equal to the desired as-detected feature size. The desired as-detected feature size may be the size for any of a number of different features (including bumps, pits, grooves, lands and the like), may be sizes or shapes in any of a number of different dimensions or spacings (including, e.g., track-wise length, radial width, z-dimension magnitude, track-wise distribution, inter-track distances or distributions and the like), and desired as-detected dimensions may be selected to achieve any of the number of different goals (such as providing a minimum, predetermined or type-averaged DC offset, achieving desired mark/space ratio, reducing asymmetry, increasing resolution, decreasing jitter, decreasing cross-talk, increasing signal to noise ratio, and the like, and/or combinations thereof).

Although features of the present invention are believed useful in a number of optical storage contexts, the present invention is believed to be especially useful in the context of a first surface medium, including as described in U.S. patent application Ser. Nos. 09/560,781 and/or 09/315,398, incorporated herein by reference. In the preferred embodiment, the optical medium is a first-surface medium. Although it may be subject to more than one definition, in one embodiment, the first-surface optical medium refers to a medium in which the read beam during a read operation is incident on or impinges on information content portions of the first-surface optical medium before it impinges on a substrate of the first-surface optical medium. The "information content portions" can be defined as portions of the optical medium that store or contain servo data, address data, clock data, user data, system data, as well as any other information that is provided on the optical medium. The "information content portions" can be integral with the substrate such as the case of a read-only medium. The information content portions can also be separately provided. In such a case, the information content portions can be, for example, an information layer of a writeable medium.

In one additional or alternative definition, the first-surface optical medium can refer to an optical medium having a tangible thickness in which a read light beam during a read operation traverses less than 100 micrometers of this thickness before impinging on the information content portions.

Figure 18:
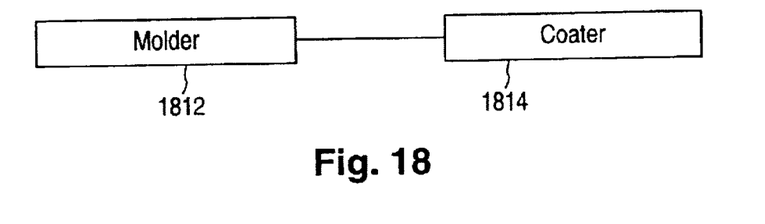
FIG. 18 is a block diagram depicting apparatus that can be used for fabricating disks according to an embodiment of the present invention.

In at least some approaches, a first surface medium may be formed by a process which includes molding in a molder device 1812 (FIG. 18) such as an injection-molding device, to form a pre-disk having features formed on at least a portion of a surface, (including by a process generally as described in U.S. application Ser. No. 09/652,975, filed Aug. 31, 2000, optionally providing a metallic or other reflective material, and forming a thin film using a coater 1814 (e.g. by a sputtering process, electron beam process, spin coating, an ion deposition process, electro-deposition process or the like) substantially over the data layer or surface. Those of skill in the art, at least after understanding the present disclosure, will understand appropriate injection molding or other pre-form forming apparatus and will understand appropriate sputtering apparatus or other apparatus for coating with one or more thin films. The film is preferably sufficiently think that a substantially first-surface medium is the result. Typically, such a thin film will be less than about 200 nanometers thick (i.e., in the z-dimension), more preferably less than about 130 nanometers thick and even more preferably less than about 100 nanometers thick. In one embodiment, the film serves the function of at least partially enhancing contrast or bit-detectability. However, many type of thin films can be provided including protective films, anti-reflective films and the like. In one embodiment a dielectric film, formed substantially of $SiO_xN_y$ (silicon oxynitride) is provided.

As noted above, in typical previous devices where the read/write beam travels through a relatively thick substrate (such as about 100 micrometers or more) before reaching a data layer, the presence or thickness of the relatively thick substrate was considered to have little effect on certain parameters such as as-detected feature sizes, DC offset, signal to noise ratio and the like. However, it has been found that thin films can have an effect on the as-detected feature size, signal to noise ratio and/or DC offset and the like, which can be significant for at least some optical storage systems (i.e. can affect efficiency, reliability and similar aspects of the system), especially for first surface media. Accordingly, in one aspect of the invention, the physical size or shape of features, or their spacing or arrangement on a data layer is adjusted to compensate for, or take into account, the effect of a thin film. In one embodiment, e.g., when a feature involves a pit or depression, with respect to the land region, a track-wise (longitudinal) dimension of the feature is increased, preferably by an amount about equal to twice the projection of a feature side wall film thickness on the data plane. In another embodiment, particularly useful for features which project outwardly or upwardly (i.e., in the z-dimension) with respect to the data surface, the physical feature size is made smaller than the desired as-detected size, so as to at least partially account for the presence of and/or thickness of, the thin film, such as being decreased by an amount equal to about twice the projection of the feature sidewall film thickness on the data plane.

In some approaches, adjustment, for compensating for or accounting for the effects of a thin film, can be achieved empirically, such as by adjusting feature sizes and testing the results, in an iterative fashion until desired results (or ranges of results) are achieved (such as desired data discrimination, desired signal to noise ratio and/or desired DC offset is obtained).

DETAILED DESCRIPTION OF THE PREFERRED EMBODIMENTS

Figures 1, 2:
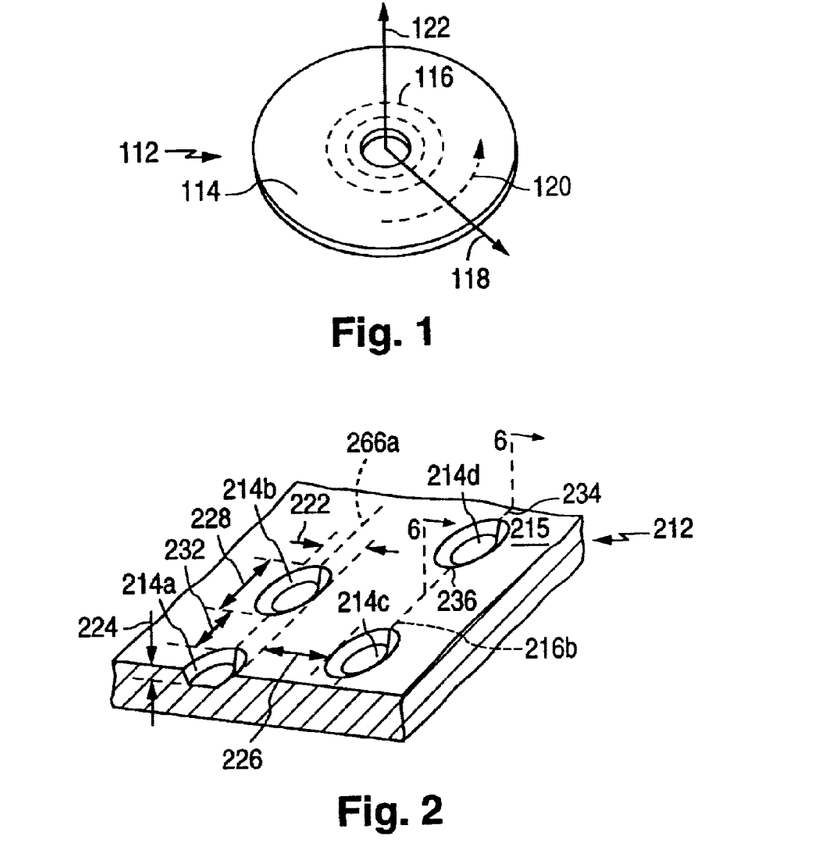
FIG. 1 is a top perspective view of a data disk of a type that can be used in accordance with an embodiment of the present invention.
FIG. 2 is a partial perspective view of an uncoated surface of a data disk having pits formed on adjacent tracks.
Figure 3:
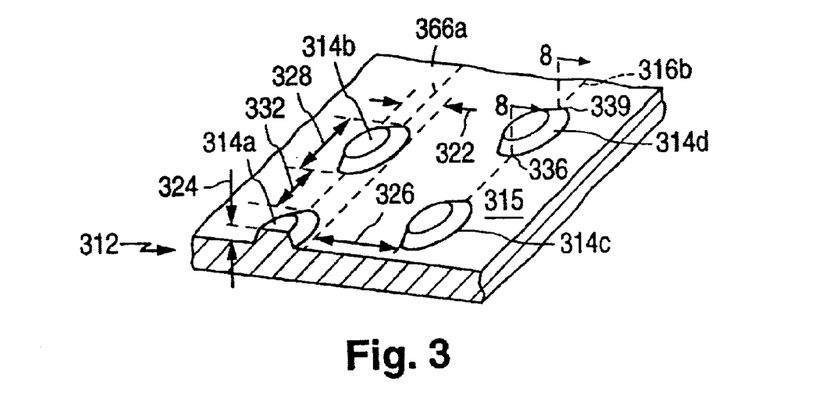
FIG. 3 is a partial perspective view of an uncoated surface of a data disk having bumps formed on adjacent tracks.
Figure 4:
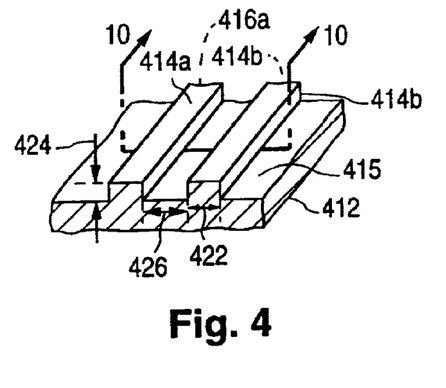
FIG. 4 is a partial perspective view of an uncoated surface of a data disk having lands formed on adjacent tracks.
Figure 5:
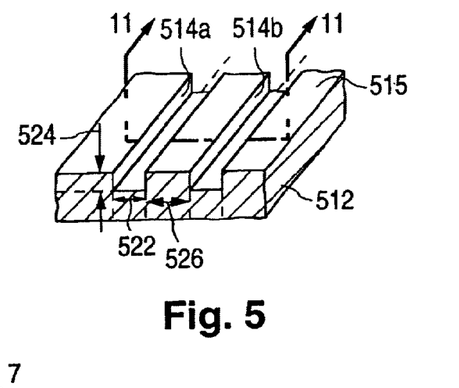
FIG. 5 is a partial perspective view of an uncoated surface of a data disk having grooves formed on adjacent tracks.

As shown in FIG. 1, an optical disk 112 has at least one major surface 114 having one or more circular 116 or spiral tracks defined thereon by the position of pits, bumps, lands, grooves or other features. Directions or positions on or with respect to the optical disk 112 can be discussed with reference to a radial axis 118, a z-axis 122 (which is perpendicular to the surface or plane 114 of the disk 112) and a track-wise dimension or direction 124. In the illustration of FIG. 2, a portion of a data layer or surface 212 has a plurality of pits or depressions 214a,b,c,d formed therein, positioned on adjacent tracks 216a,b. Similarly in FIG. 3, a plurality of raised features or bumps 314a,b,c,d positioned along adjacent tracks 316a,b project above the major surface or the land surface 315 of a data layer 312. FIG. 4 illustrates raised lands projecting in the z-direction (outwardly or upwardly) from a surface 415 of a data layer 412 defining first and second tracks 416a,b and FIG. 5 illustrates first and second grooves projecting in the z-direction (inwardly or downwardly) with respect to the major surface 515 of a data layer 512. Although FIGS. 4, 5, 10 and 11 depict lands and grooves with substantially vertical sidewalls, in practice, sidewalls for lands and grooves will typically have an angle or slope, e.g. between about 30° and about 60°.

FIGS. 2–5 depict a data layer without a film or coating placed thereon. As seen from FIGS. 2–5, the size, shape and position of the features and tracks define a number of physical features or spacings of the features or tracks. The features 214b; 314b; 414a,b; 514a,b can each be defined as having a radial width 222, 322, 422, 522 a z-dimension magnitude (i.e., a depth 224, 524 in the case of a pit or groove or a height 324, 424 in the case of a bump or land) inter-track spacing 226, 326, 426, 526 and, for features such as pits and bumps, a (track-wise) length 228, 328, and the like. Some or all features of the present embodiment can be used in connection with a variety of sizes and shapes of optical disk features. In one particular embodiment, features typically have a z-dimension magnitude 224 of about 80 nanometers or more, a radial dimension magnitude 222, 322, 422, 522 of about 230 nanometers or more, a length 228, 328, 428, 528 between about 300 nanometers and about 2000 nanometers, inter-feature spacing (track-wise) 232, 332 of about 300–2000 nm, track pitch (center-to-center distance between adjacent tracks) of about 740 nm, and track-to-track (or inter-track) spacing (between adjacent edges of adjacent tracks) 226, 326, 426, 526 of at least about 300 nm, typically at least about 400 nm for a read-only area or disk. In at least some optical storage approaches, all of the pits 214a,b,c,d and/or all of the bumps 314a,b,c,d will have substantially similar widths 222, 322, but may differ substantially in the track-wise dimension or length 228, 328. In these systems, there will at least be a plurality of relatively short (track-wise) pits or bumps (or other features) and a plurality of relatively longer pits or bumps (or other features) and typically the read/write system must be capable of detecting (and preferably distinguishing between) the short (track-wise) and long (track-wise) features.

FIGS. 6–11 depict cross sections through various feature-bearing portions of data layers after a thin film 612, 812, 1012, 1112 has been provided. The data layer 212, 312, 412, 512 can be formed or provided in a number of fashions. In one embodiment, the data layer is formed by injection molding a polycarbonate or similar substance using a form having members (e.g., "stampers") which define the features, generally as described in co-pending application Ser. No. 09/954,975, filed Aug. 31, 2000, entitled Double-Sided Digital Optical Disk and Method incorporated by reference. Other possible procedures for forming data layers can include injection/compression formation (as is used, e.g. in compact disk (CD) fabrication), stamping (as was used in vinyl audio recording formation) and the like. The data layer may be formed directly of a material having desired reflectivity or other optical properties, or may have a metal alloy or other material placed thereon (not shown in the illusions), e.g., for providing the reflective surface on which the read/write beam is substantially focused.

The thin film 612, 812, 1012, 1112 has (on horizontal surfaces) a z-dimension magnitude or thickness 614, 814, 1014, 1114 sufficiently small that the structure operates substantially as first surface optical medium (e.g., as described above). In one embodiment, the thickness 614, 814, 1014, 1114 (or, if multiple layers 1212a,b,c are provided, e.g., as depicted in FIG. 12, the combined thickness 1214) is less than about 200 nanometers, preferably less than about 130 nanometers and even more preferably less than about 100 nanometers.

Figure 6:
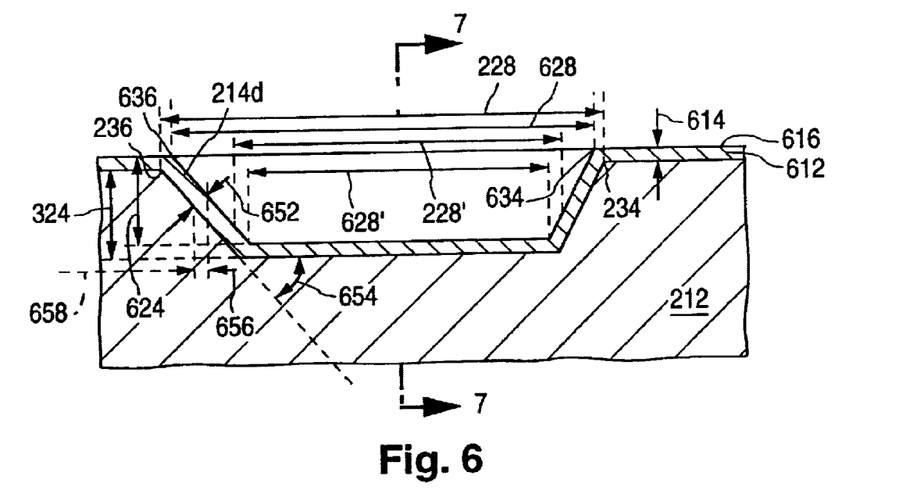
FIG. 6 is a cross-sectional view taken along line 6—6 of FIG. 2, but after a thin film has been applied thereto.
Figure 7:
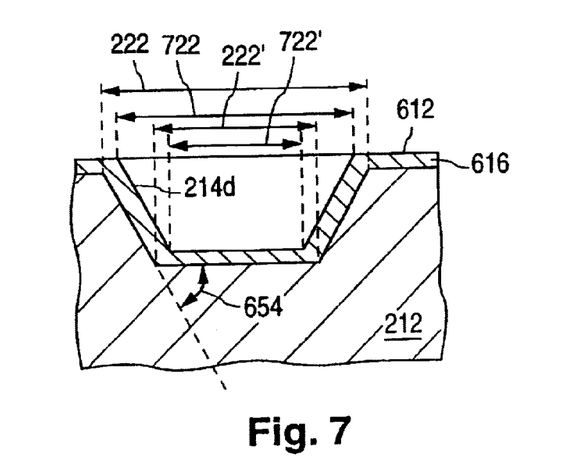
FIG. 7 is a cross-sectional view taken along line 7—7 of FIG. 6, but after a thin film has been applied thereto.
Figure 8:
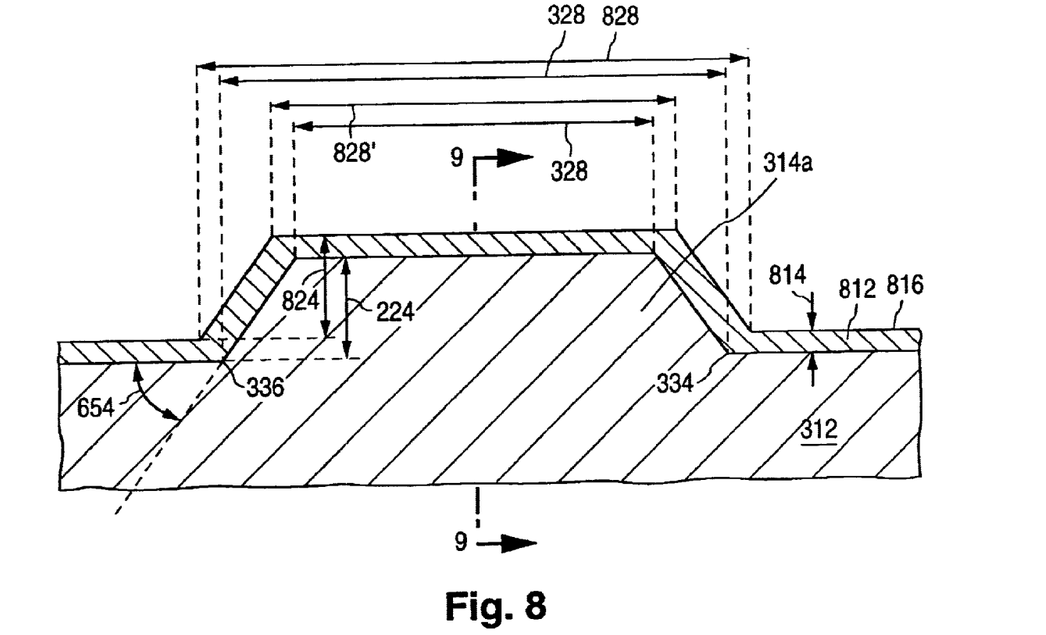
FIG. 8 is a cross-sectional view taken along line 8—8 of FIG. 3 but after a thin film has been applied thereto.
Figure 9:
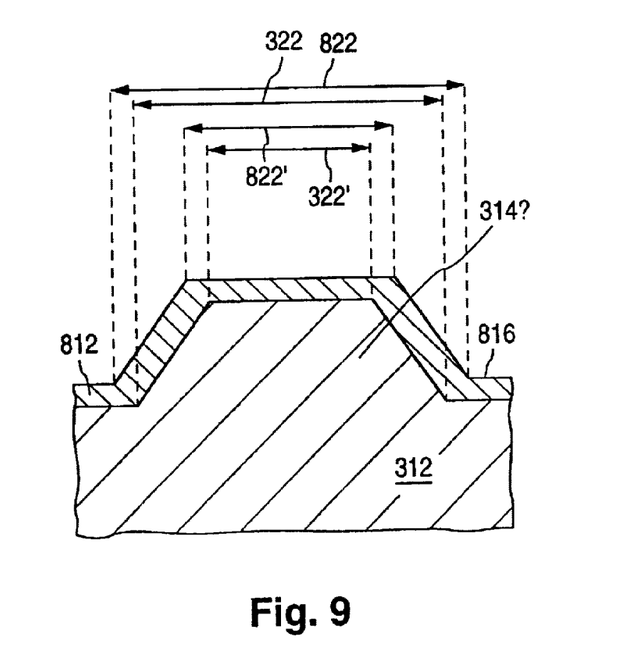
FIG. 9 is a cross-sectional view taken along line 9—9 of FIG. 8
Figure 10:
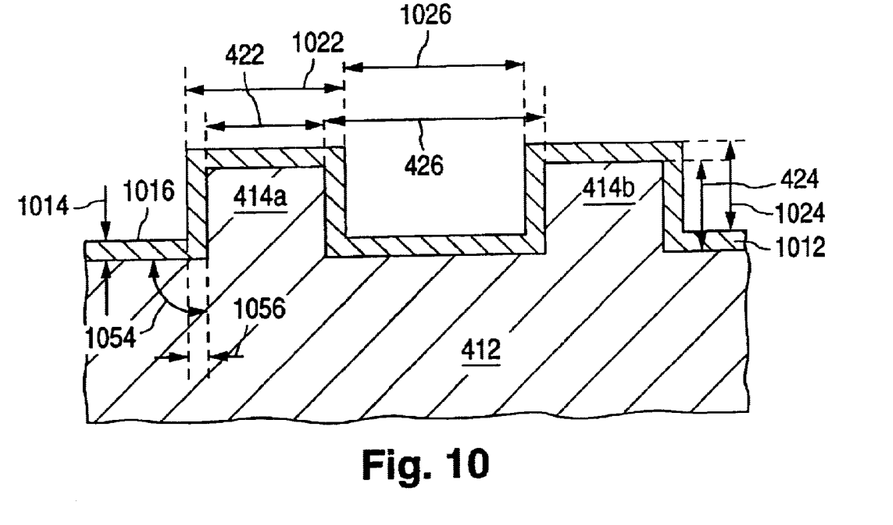
FIG. 10 is a radial cross section taken along line 10—10 of FIG. 4, but after a thin film has been applied thereto.

As illustrated in FIGS. 6–11, the thin films 612, 812, 1012, 1112, 1212 define an upper surface 616, 816, 1016 which has a size, shape or geometry differing somewhat from the underlying features. For example, as shown in FIG. 6, although the pit 214d defined in the data layer 212 has a first length 228, the length of the pit as defined by the upper surface 616 of the film 612 has a somewhat shorter length 628. Similarly, the length 828 of the feature defined by the upper surface 816 of the bump 314d as illustrated in FIG. 8 is somewhat greater than the length 328 defined by the underlying feature 314d. A pit width 722 defined by the film upper surface 616 is somewhat smaller than the pit width 222 defined by the data layer 212 (FIG. 7) and the bump width 922 defined by the upper surface 816 of the coating or film is somewhat larger than the bump width 322 defined by the data layer 312. This relationship occurs regardless of whether the feature length and width is measured at the land level 228, 628, 222, 722, 328, 828, 322, 922, at the bottom of the feature (in the case of pits) 228', 628', 222', 722', at the tops of the features (in the case of bumps) 828', 328', 922', 322' or some other intermediate position. As illustrated in FIG. 10, in the case of lands 414a, 414b the width 1022 defined by the upper surface 1016 of the film is somewhat greater than the width 422 of the underlying land 414a formed in the data layer. In the case of grooves, the width 1122 defined by the upper surface of the filing is somewhat less than the width 522 of the groove 514a formed in the data layer 512.

It has been found that, in at least some optical disk configurations, even though the thin film is formed of a material which is substantially transparent to the optical read/write beam, and even though film thickness is typically less than a wavelength, the presence and/or thickness of the film 612, 812, 1012, 1112 can affect optical detection parameters with respect to the detection or sensing of features. Without wishing to be bound by any theory, it is believed that, for at least some optical or detection parameters, the system behaves as though the shape and size or spacing of the feature of the recording layer is modified to correspond to the shape, size or spacing of the upper surface 614, 814, 1014, 1114 of the thin film. For example, if a system is intended to detect a change of reflectivity both when the leading edge 234 of a pit 214d and the trailing edge 236 pass beneath a read/write beam (not shown) e.g., as the disk 114 rotates while the beam is positioned along track 216b, it has been found that, in at least some situations rather than detecting the leading 234 and trailing 236 edges of the pit 214d defined in the data layer 212, the system will define the transition at the leading and trailing edges 634, 636 defined by the upper surface 616 of the thin film 612 (FIG. 6). For this reason, in these situations the system will detect a length 628 ("as-detected length") 628 which is shorter than the actual physical length 228 of the pit 214d formed in the data layer 212. Similarly, transitions in a reflectance signal or similar signal caused by radial movement will result in a signal reflecting an as-detected width 722 which is less than the actual physical width 222 of the pit 214d (FIG. 7).

In the case of a bump, the as-detected length 828 is greater than the physical length 328 (FIG. 8) and the as-detected width 922 is greater than the physical width 322. Similarly, the as-detected land width 1022 (FIG. 10) will be greater than the actual physical land width 422 and the as-detected groove width 1122 (FIG. 11) will be less than the physical groove width 522. It is noted, however, that there is substantially no difference, for most purposes, between the as-detected z-dimension magnitude of features 624, 824, 1024, 1124 and the corresponding physical z-dimension of features 224, 324, 424, 524.

Without wishing to be bound by any theory, it is believed that the existence and/or significance of, such effects of thin films on optical data recording and/or the need for, and techniques for, compensating or addressing these effects, has generally been previously unrecognized or unappreciated, at least partially because the effects are somewhat counter-intuitive given the transparent and sub-wavelength nature of the thin films and partially because there has been little, if any, previous effort to provide a practical first surface optical recording system, especially in a small format.

Figure 14A:
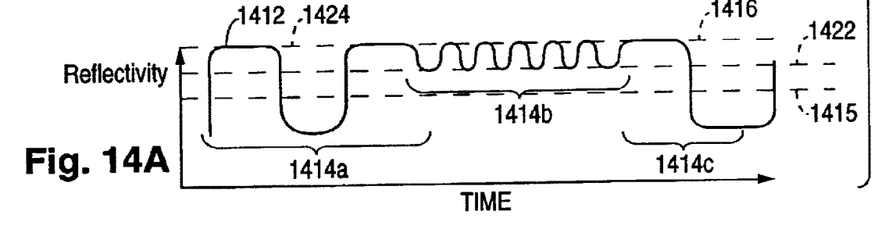
FIG. 14A is an illustration of a reflectance signal from a series of features in the absence of substantial compensation.
Figure 14B:
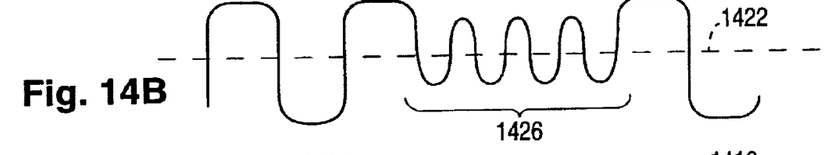
FIG. 14B is an illustration similar to that of FIG. 14A, but showing a reflectance signal from a disk formed using compensation according to an embodiment of the present invention.
Figure 14C:
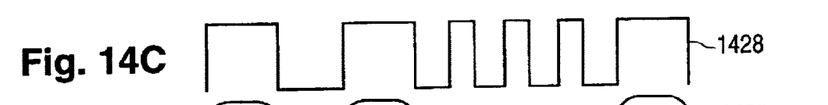
FIG. 14C illustrates a binary output provided in using the reflectance signal from FIG. 14B, according to an embodiment of the present invention.

There are a number of potential undesirable consequences of these (or other) effects caused by the presence or thickness of a thin film. One undesirable consequence is illustrated by FIG. 14A which is a graph showing (on the vertical axis) a reflectivity signal 1412 through time (on the horizontal axis) as a read beam is successively aligned with two (track-wise) long depressed features 1414a, five (track-wise) short depressed features 1414b and of a long depressed feature 1414c. In at least one embodiment, leading and trailing edges of features are presumed to occur when the reflectivity signal 1412 crosses (either increasing or decreasing) a predetermined reflectivity level. Typically and preferably, the predetermined level is taken as a level midway between a normal maximum reflectivity signal 1416 and a minimum signal 1418 for long features 1414a. This midway level 1422 sometimes referred to as a DC offset value. As seen in FIG. 14A, it has been found that, in the absence of taking into account the effect of a thin film, the reflectivity signal in the region of (track-wise) short depressed features 1414b remains relatively high and never crosses a mid-value DC offset level 1422. An effect similar to that illustrated in FIG. 14A is also found for raised features; but in that case, the signal for short raised features remains relatively low, but similarly may never cross the mid-level DC offset level 1422. Accordingly, in the situation depicted in FIG. 14A, in order to detect short depressed features 1414b, it would be necessary to use a DC offset value 1424 which substantially departs from the desired mid level value 1422. When a DC offset or threshold value is set relatively far from a mid level value, there tends to be an undesirable amount of distortion, and the system can be unacceptably sensitive to variations in bit lengths. FIG. 14B illustrates a corresponding situation but in which the effect of the thin film has been accounted for (e.g., as described below). In this situation, a region having (track-wise) short depressed features 1426 has reflectivity changes which are substantially centered around the mid level DC offset 1422. FIG. 14C illustrates a digital (binary) output which can be obtained from triggering rising and failing edges of pulses by increasing and decreasing crossings (respectively) of the DC offset value 1422.

Figure 16:
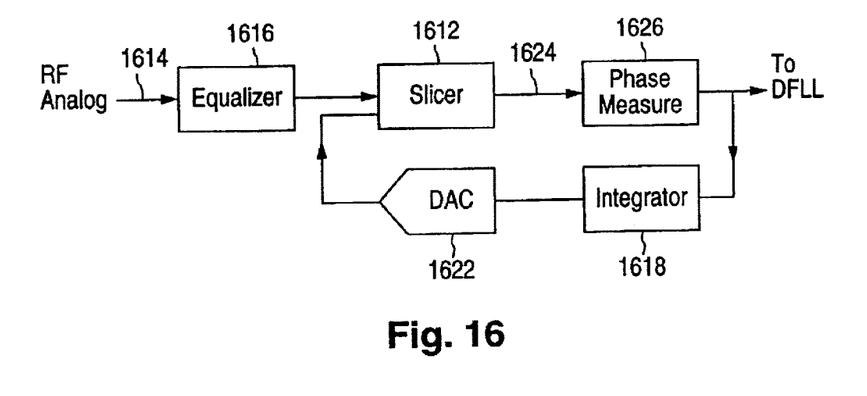
FIG. 16 is a block diagram of a read channel, usable in accordance with embodiments of the present invention.

The value of asymmetry can be useful to evaluate DC offset. Asymmetry is a measure of the relative DC levels of the short versus long marks and can be expressed in units of percent of large mark peak-to-peak amplitude. For a "slicing channel," it is desirable to have asymmetry as close as possible to zero. With reference to FIG. 16, the slicer component 1612 compares an analog signal 1614 (which indicates, e.g. reflectivity of the read beam), processed by an equalizer 1616, to a reference slicing level which is the result of providing a digital interrogator signal from an interrogator 1618 through a digital-to-analog converter 1622. The slicer 1612 provides a digital output signal 1624 every time there is a transition of the analog signal 1614, i.e. a crossing of the reference level or threshold level. A phase measure cell 1626 detects any transition from the slicer 1612. For each slicer edge, the phase measure cell 1626 generates an "event" and a "polarity" signal. The event signal stays high for one clock cycle to indicate that a transition has been detected in the clock window. The "polarity" signal transitions high if the transition was an increasing or rising edge, and transitions low if the signal was a falling edge. If asymmetry deviates from zero, the transitions will tend to move further from the center of the clock window, decreasing the likelihood of the transition being detected in the desired location.

Figure 17A:
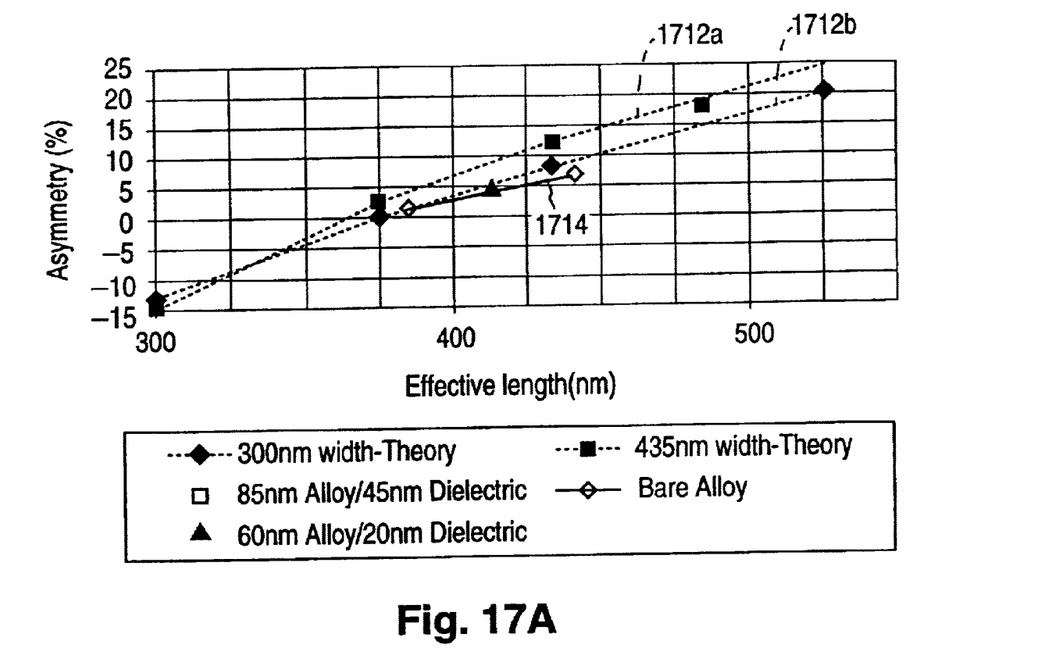
FIG. 17A is a graph of asymmetry as a function of as-detected bump length.
Figure 17B:
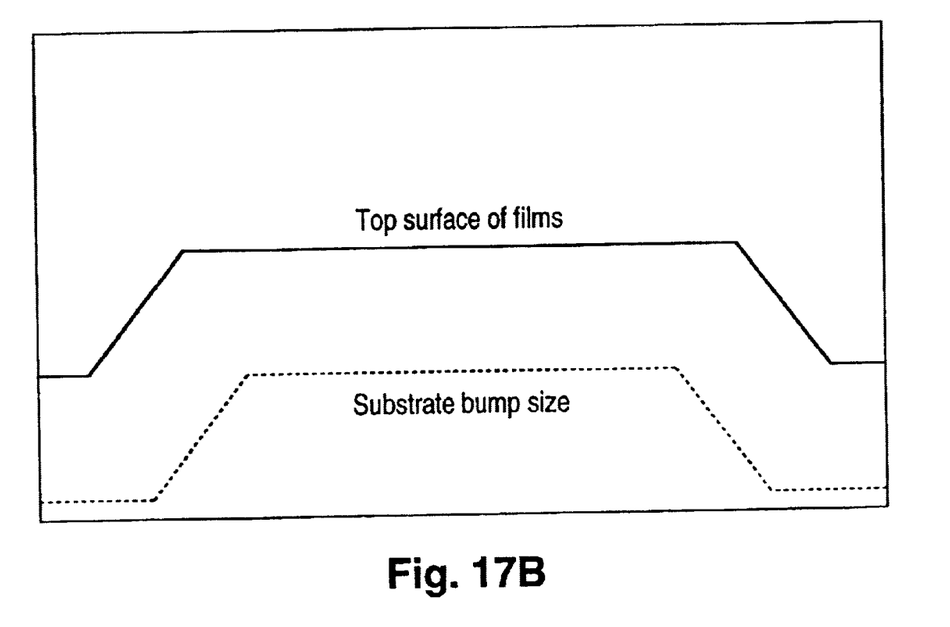
FIG. 17B illustrates the growth of bumps due to the addition of films.

FIG. 17A illustrates theoretically calculated asymmetry for 300 nanometer-width features (1712*b*) and 435 nanometer-wide features (1712*a*), and experimentally-obtained data points 1714, with asymmetry (percentage) shown on the vertical axis and as-detected feature length (in nanometers) shown on the horizontal axis, for a bump height of about 80 nanometers, bump length of about 300 nm, bump width of about 230 nanometers, and a sidewall angle of about 45° (uncoated dimensions of the features). As seen in FIG. 17A, for at least some as-detected bump lengths, there can be substantial departures from zero percent asymmetry.

Figure 13:
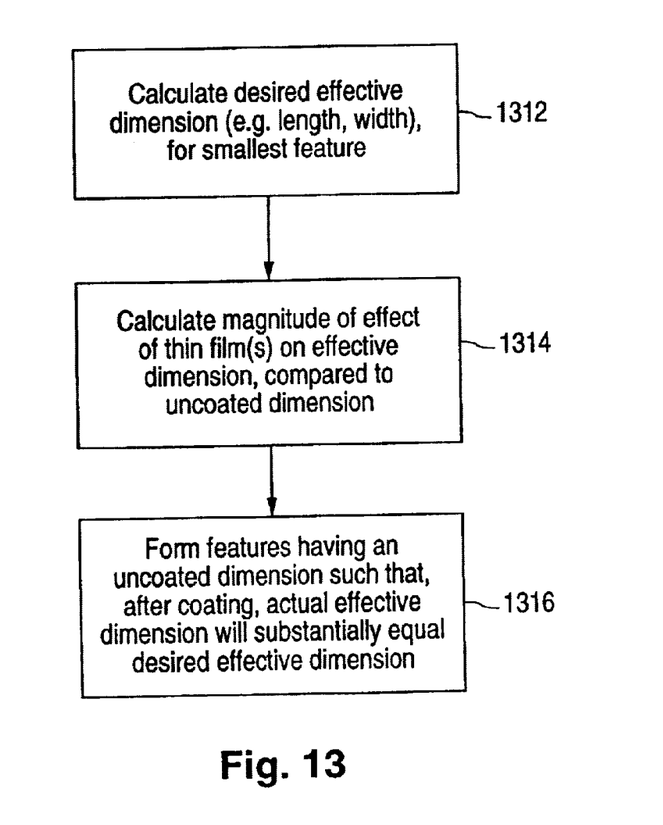
FIG. 13 is a flowchart illustrating a process according to one embodiment of the present invention.

There are a number of ways in which the effect of a thin film can be taken into account so as to avoid some or all potential disadvantages arising from thin film effects. In the approach illustrated in FIG. 13, the as-detected dimension(s) (e.g., track-wise length, feature width and the like) desired for various features is calculated 1312. As will be understood by those of skill in the art, at least after understanding the present disclosure, the dimensions which are desired may be affected by a number of factors including the encoding scheme which is used, the wavelength of the read/write beam, data density and the like. In one embodiment, the optical disk is configured for use in connection with a read/write device having a read/write beam wavelength of about 650 nanometers and a numerical aperture of about 0.6. Optical disks, and read/write devices therefor, can be provided generally in accordance, e.g. with those described in the patent applications which are incorporated by reference, supra. In one example, it is possible to calculate dimensions of the smallest feature so as to achieve a desirable and effective DC offset value, e.g., as illustrated in FIG. 14B (as opposed to feature dimensions which would tend to bring about the undesirable situation illustrated in FIG. 14A). This represents the desired as-detected feature size. This determination can be made on a theoretical or modeling basis, or can be determined empirically (such as testing various bit lengths on an uncoated optical disk to determine the bit size at which there is a significant departure from the desired situation as depicted in FIG. 14B).

The magnitude of the effect of thin films on as-detected (as opposed to physical) feature dimensions is determined or calculated 1314. In one approach, the magnitude is taken as being substantially equal to the projection, onto a plane parallel to the major surface of the data layer, of the film thickness 652 as it occurs on the side wall of a feature. For example, when the side wall is at an angle 654 of about 45°, the magnitude of the projection of the thickness 656 on a plane parallel to a major surface of the disk 114 is equal to the film thickness 652 (which can, in many cases, be taken to the equal to the vertical thickness 614) times an "angle factor" of $2^{-\frac{1}{2}}$. Because, in general, there will be an effect on two opposing side walls of a feature, the total effect will be twice this value. Thus, in one embodiment, for a bump, the magnitude of the effect is estimated such that the as-detected length (e.g., 828 in FIG. 8) is equal to the feature physical length 328 plus the correction value noted above, or $$L_{828}=L_{328}+(2/\sqrt{2})D_{814} \quad (1)$$

Where $L_{828}$ is the as-detected bump (trackwise) length, $L_{328}$ is the physical bump length (i.e. in the absence of coating) and $D_{814}$ is the film thickness.

Figure 11:
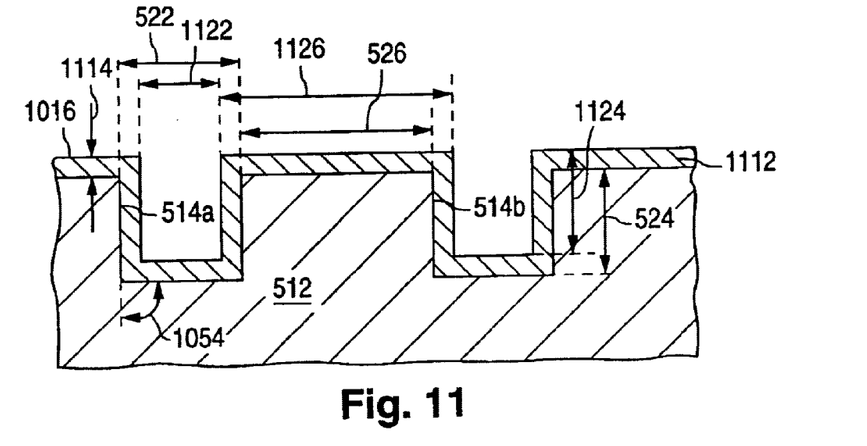
FIG. 11 is a cross-sectional view taken along line 11—11 of FIG. 5, but after a thin film has been applied thereto.
Figure 12:
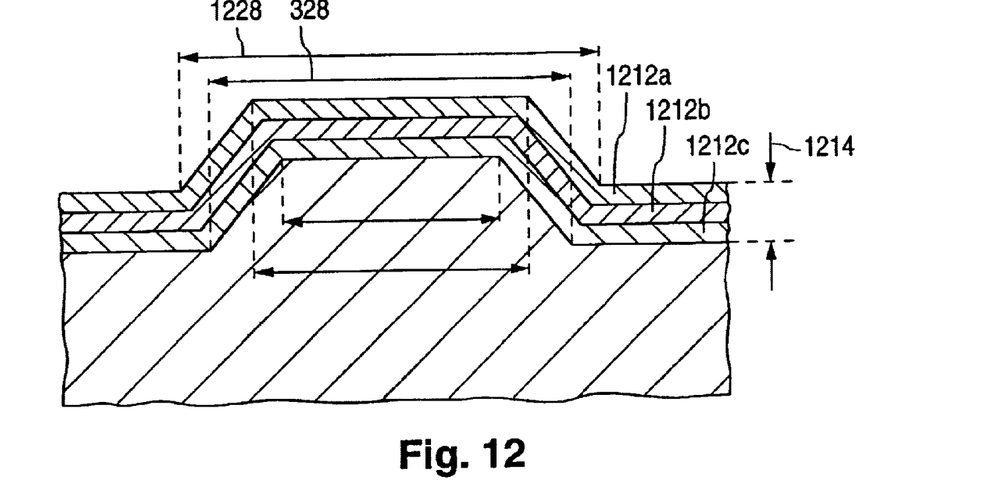
FIG. 12 is a cross-sectional view similar to the view of FIG. 8, but with multiple thin films applied.

As illustrated in FIGS. 10 and 11, when the angle 1054 is 90° the projection of the thickness 1056 is substantially equal to the layer thickness 1014 (i.e., the "angle factor" is equal to 1) so that, in the example of FIG. 10, the magnitude of the effect of the thin film can be expressed as $$L_{1022}=L_{422}+2D_{1014} \quad (2)$$

Where $L_{1022}$ is the as-detected feature width, $L_{422}$ is the physical feature width and $D_{1014}$ is the thin film thickness.

Those of skill in the art will understand how to calculate estimated correction formulas for other angles.

Once the magnitude of the effect is determined (e.g. by theoretical computation, modeling, or by empirical studies), it is then possible to proceed with forming disk pre-forms (i.e. the form of the disk before the thin film or films are applied) in such a way as to take into account and/or compensate for the effects of the thin film. For example, in the configuration of FIG. 8, solving equation (1) for the physical length, it is found that, in order to achieve the desired result, the physical length of the feature should be less than the desired as-detected length. In particular, the physical length can be estimated as:

$$L_{328}=L_{828}-(2/\sqrt{2})D_{814} \quad (3)$$

As one example, when it is desired to have an as-detected bump length, with 45° sidewalls which is no larger than about 435 nanometers, the disk pre-form must be formed with bump features having a length of about 300 nanometers (for a sidewall film thickness of about 75 nanometers).

As can be seen from comparing FIGS. 6 and 7 with FIGS. 8 and 9, and comparing FIG. 10 with FIG. 11, features such as bumps 314 and lands 414*a, b* which extend upwardly (with reference to the view of FIG. 1) along the z-axis 122 (in a direction towards the direction from which the read/write beam will arrive) can be compensated by making the (uncoated) physical feature dimension smaller than the desired as-detected dimension. In contrast, features such as pits 214*d* or grooves 514*a,b* which project downwardly (along the z-axis), (i.e. in a direction away from the direction from which the read/write beam will arrive) can be formed with physical features which are larger than the desired as-detected dimensions.

Preferably, the system is used to account for or compensate for other dimensions or spacings which may be affected by the presence or thickness of a thin film. For example, it is desired, in general, to provide relatively small track pitch in order to achieve relatively high data density. However, the inter-track spacing 226, 236, 426, 526 must be sufficiently large to avoid an undesired amount of track-to-track cross talk. As can be seen from FIG. 10, for inter-track distances calculated with respect to raised features, the effect of a thin film is to decrease the as-detected inter-track distance 1026, compared with the physical inter-track distance 426. Note that this is the opposite of the effect of the thin film on the width of raised features (which have an as-detected width 1022 greater than the physical width 422). Accordingly, in one embodiment, the effect of the thin film is accounted for or compensated for by decreasing the width of the raised physical feature but increasing the inter-track spacing of the raised physical features, in order to achieve desired as-detected width and desired as-detected inter-track spacing.

With respect to depressed features, as depicted in FIG. 11, the effect of the thin film is to provide an as-detected inter-track spacing 1126 which is greater than the physical inter-track spacing 526 and, accordingly, in one embodiment, for tracks defined by grooves or other depressed features, the physical inter-track distance is reduced (compared to the desired as-detected inter-track distance) in order to compensate for the effect of a thin film.

As shown in FIG. 12, when multiple thin films are present 1212a, 1212b, 1212c, it is possible, according to an embodiment of the present invention, to adjust the one or more physical dimensions such as a feature physical length 328 by a factor which takes into account the total thickness of the multiple films 1214, in order to achieve a desired as-detected length 1228.

Figure 15:
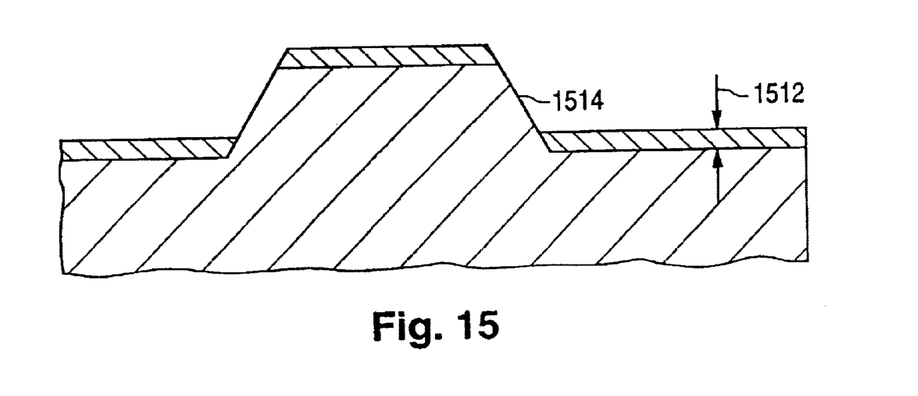
FIG. 15 is a cross section similar to FIG. 8, but with sidewall coatings reduced or eliminated.

As will be understood by those of skill in the art after understanding the present disclosure, there are other ways in which the effect of a thin film can be accounted for. For example, it is possible to provide embodiments in which the thin film is provided in such a manner that it has a desired thickness on horizontal surfaces 1512 (FIG. 15) but has little or no thickness positioned on feature side walls 1514. For example, this structure may be achieved by an ion deposition process on 90° sidewall structures.

In another embodiment, the effect of the presence or thickness of a thin film can be to provide a separately-molded thin cover layer, having features molded into it, which is glued or otherwise coupled to a substrate.

In general, injection molding equipment, materials and processes (or other equipment, materials and processes for forming disks or disk pre-forms) are selected or adjusted in accordance with, among other parameters, the size and shape of the features to be replicated. Accordingly, if, e.g., an injection molding process is used to provide features which have been reduced or increased in size (in order to compensate for the effects of a thin film) it may be necessary to adjust or modify injection molding parameters (such as pressures, temperatures, hold times and the like) in order to achieve the desired feature size. Some aspects of relationships between features sizes and injection molding parameters are discussed in U.S. application Ser. No. 09/652,975, filed Aug. 31, 2000, incorporated herein by reference.

In light of the above description, a number of advantages of the present invention can be seen. The present invention makes it feasible to provide a medium such as an optical disk, preferably a first surface medium, with one or more thin films while still achieving desirable or acceptable levels of signal to noise ratio, mark/space ratio, asymmetry, resolution, jitter, DC offset and the like. The present invention provides a basis for obtaining theoretical or modeling estimates of adjustments which can be useful for avoiding undesired consequences of the presence or thickness of a thin film. In one aspect, effects of a thin film are adjusted for or compensated for, at least partially using an empirical or iterative process. In one aspect, the present invention provides guidance for conducting an effective and efficient empirical or iterative adjustment process (such as recognizing the different effects on raised verses depressed features and/or on feature dimensions verses inter-track dimensions). The present invention makes it possible to provide effective optical storage devices or media containing one or more thin films, preferably in the context of first surface media, with desirable data integrity, and ease of use.

A number of variations and modifications of the invention can be used. It is possible to use some aspects of the invention without using others. For example, it is possible, but not necessarily desirable, to correct feature lengths without correcting feature widths or inter-track spacings. Although the present invention was described in the context of an optical disk, it is also possible to use some or all aspects of the present invention in connection with other optical storage media including plates, films, drums, and three-dimensional media such as three-dimensional holographic blocks. Although examples have been described above in relation to first surface media, it is also possible to use some or all aspects of the present invention in other variations or embodiments such as double-sided disks, disks with multiple stacked data layers, disks which are read or written using any of a plurality of light wavelengths, such as blue light, ultraviolet, infrared and the like, devices using read/write beams which are non-laser light and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for producing an optical disk having features formed on a planar surface of the optical disk, wherein the features have lateral dimensions defined in the plane defined by the planar surface and longitudinal dimensions defined normally to the planar surface, comprising:

determining a first lateral magnitude which is desired for at least one feature to be formed on the optical disk's planar surface;

providing a stamper having a plurality of stamper features formed therein, including at least a first stamper feature, said first stamper feature having a lateral magnitude different from said first lateral magnitude;

providing an optical disk pre-form having a planar first surface and an opposing second surface;

stamping the planar first surface of the optical disk pre-form to form an optical disk substrate having a plurality of disk features corresponding to said stamper features on the stamped surface, said plurality of disk features including a first disk feature corresponding to said first stamper feature;

forming an information layer on the stamped surface of the substrate; and forming at least a first thin film on at least a portion of the information layer, said portion covering at least said first disk feature, wherein the thickness of the first thin film is less than the longitudinal dimension of the first disk feature, wherein said first disk feature, after deposition of the information layer and the first film, has an as-detected lateral magnitude about equal to said first lateral magnitude using a light beam that does not pass through the substrate.

2. A method, as claimed in claim 1, wherein said plurality of disk features includes one or more features selected from the group consisting of a bump, a pit, a groove and a land.

3. A method, as claimed in claim 1, wherein said step of providing at least a first thin film coating provides a first-surface optical disk.

4. A method, as claimed in claim 1, wherein said first lateral magnitude is less than about 450 nanometers.

5. A method, as claimed in claim 1, wherein said first lateral magnitude is less than about 250 nanometers.

6. A method, as claimed in claim 5, wherein said disk further includes at least one feature with a lateral dimension of at least 2 micrometers.

7. A method as claimed in claim 1 wherein said thin film has a thickness less than about 200 nanometers.

8. A method as claimed in claim 1 wherein said thin film has a thickness less than about 100 nanometers.

9. A method as claimed in claim 1 wherein said thin film has a thickness less that about 50 nanometers.

10. A method as claimed in claim 1 wherein said first stamper feature has a lateral magnitude different from said first lateral magnitude by an amount less than or equal to about a thickness of said first thin film.

* * * * *